July 24, 1923.
R. RÜDENBERG ET AL
1,462,580
METHOD OF MANUFACTURING ELECTRIC CONDUCTORS
Filed Dec. 27, 1920
2 Sheets-Sheet 1
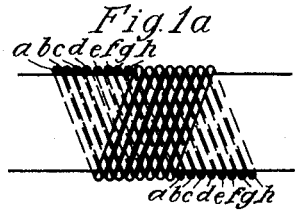
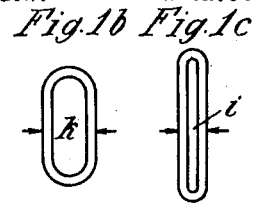
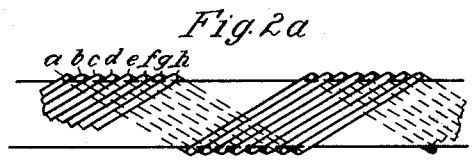
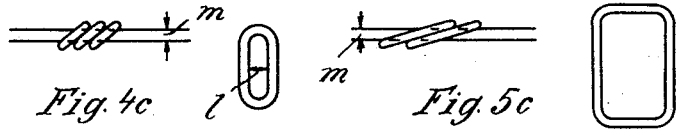
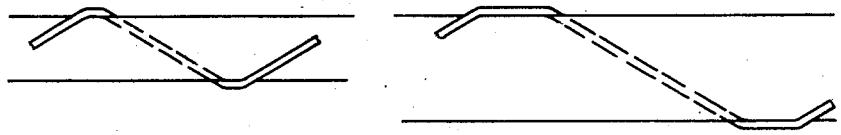
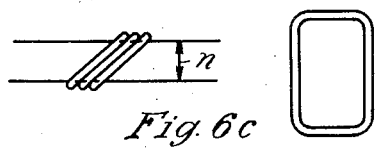
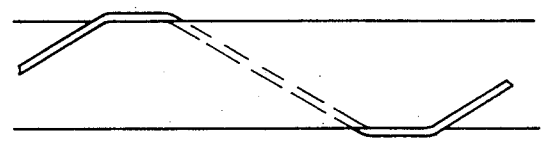
Inventor
Reinhold Rüdenberg and
Adolf Zanckbein
by Knight Bros
attorneys

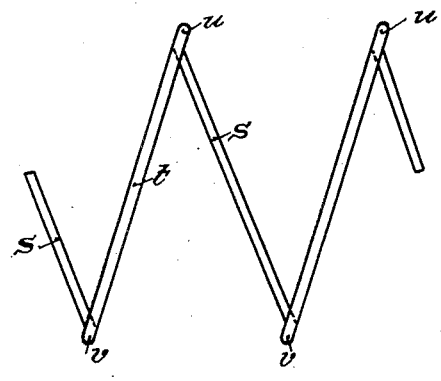
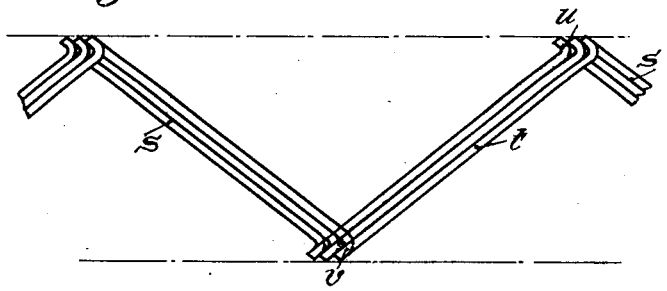
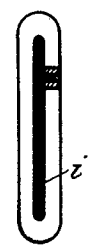
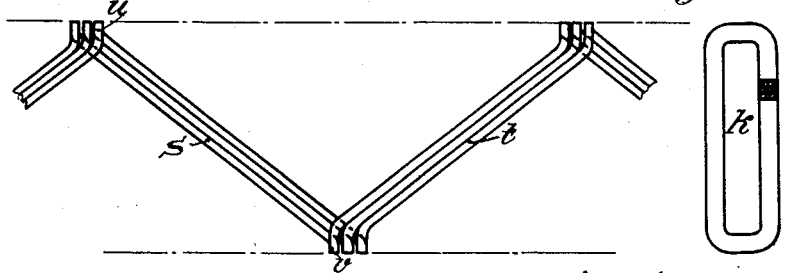
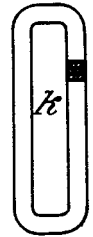

Patented July 24, 1923.

1,462,580

UNITED STATES PATENT OFFICE.

REINHOLD RÜDENBERG, OF BERLIN-GRUNEWALD, AND ADOLF FINCKBEIN, OF CHARLOTTENBURG, GERMANY, ASSIGNORS TO SIEMENS-SCHUCKERTWERKE GESELLSCHAFT MIT BESCHRÄNKTER HAFTUNG, OF SIEMENSTADT, NEAR BERLIN, GERMANY, A GERMAN CORPORATION.

METHOD OF MANUFACTURING ELECTRIC CONDUCTORS.

Application filed December 27, 1920. Serial No. 433,453.

*To all whom it may concern:*

Be it known that we, REINHOLD RÜDENBERG and ADOLF FINCKBEIN, citizens of the German Empire, residing at Berlin-Grunewald, Germany, and Charlottenburg, Germany, respectively, have invented certain new and useful Improvements in Methods of Manufacturing Electric Conductors (for which we have filed applications in Germany, Dec. 14, 1917, and Dec. 29, 1917; Hungary, Nov. 13, 1918, and Nov. 14, 1918; England, July 8, 1920, and July 9, 1920; Sweden, Jan. 7, 1920; Switzerland, July 23, 1920; and Austria, Aug. 27, 1920), of which the following is a specification.

Our invention relates to a method of manufacturing electrical conductors. For many purposes and more particularly, for conductors carrying heavy currents, it is necessary to employ multiple conductors. Now, the manufacture of such conductors is always rendered difficult wherever the cross-sectional shape deviates from a round shape, for the reason that such a deviating form cannot be readily attained by carrying out of the customary twisting operation on the twisting machines.

Our invention refers in particular to an improved method of manufacturing multiple conductors, which will be found to excel by reason of its extraordinary simplicity and which will prove suitable for conductors of any desired size, only very simple machines being required to carry our improved method into effect. The multiple bars produced according to this improved method are rendered very stiff and are moreover but to a very slight degree liable to warp and bend during the process of manufacture, an incident otherwise easily occurring whenever a conductor twisted in the manner hitherto used is being subsequently shaped into loops by a pressing operation.

We will now proceed to more fully describe our improved method with reference to the drawings annexed to this specification and forming part thereof. In these drawings Figures 1$^a$ and 1$^b$ show a front view and cross-sectional shape, respectively, of a plurality of single conductors wound to a coil, Figure 1$^c$ shows the cross-sectional shape of the coil after it is flattened, Figures 2$^a$ and 2$^b$ show a side view and cross-sectional shape of the coil after having been stretched, Figure 3 shows the composite conductor after its completion, Figures 4–6$^a$,$^b$,$^c$ show side views and cross-sectional shapes respectively, of several modified forms of execution.

Figures 7 and 8 show sectional views of the original coil before and after flattening, and Figures 9 to 13 show side views and cross-sections, of a composite conductor produced in accordance with our improved method.

In carrying out the method in accordance with our invention, the individual conductors forming the composite conductor are first of all wound either together or singly to form flat, cylindrical coils with their turns as close together as possible. The manufacture of these coils is carried out by any one of the customary methods, for example by winding the individual wires of the composite conductor about two pins fixed to a support. In Figures 1$^a$ and 1$^b$ are shown a series of single conductors $a\ b\ c\ d$, etc. wound to a coil in the manner aforesaid. Now whenever it becomes necessary to twist these conductors together in order to form a flat composite conductor the thickness $i$ (Figure 1$^c$) of which is smaller than the thickness $k$ of the coil (Fig. 1$^b$), then this latter may be simply compressed until the desired flatness illustrated by Figure 1$^c$ is obtained. There is thus provided a ready means of adjusting the thickness of the composite conductor according to requirement by simply pressing together the flat coil. Hereupon, the turns of the coils are stretched (Figure 2$^a$) to such an extent until the coils thus drawn apart attain the desired height of the composite conductor as required to fit for instance an armature slot (Figure 2$^b$).

After all the conductors comprising the composite conductor have been manufactured either conjointly or preferably, singly to form a flat coil in the manner aforesaid, they are laid together one by one until finally the complete conductor bar has been produced (Figure 3).

In the form hereinbefore described, the flat turns of the coil are given the shape corresponding to the section of the finished composite conductor principally by pressing the flat coils together (Figure 1c). According to the nature of the pressing action, there may be allowed to remain, if deemed expedient, an internal space, the dimension of which is amply sufficient for the insertion of an insulation serving to suitably insulate from each other the crossing conductors of the two sides of the composite conductor or bar. On the other hand, if preferred, the internal section of the bar may be made sufficiently large to act as a channel for the introduction of cooling air. In such a case, the coil need not be pressed together, but may be for instance directly wound on a mandril or other suitable means leaving a channel of the desired size.

Now when stretching the coils, in order to give them for instance the sectional shape disclosed in Figure 1b, and to obtain the desired pitch on either the broad sides or the narrow sides of the finished conductor, there may be exerted a greater amount of pull on the long sides of the flat coil and but a slight amount of pull on the short arcs comprising the narrow sides (Figure 1c) or else the operation may be reversed, and the greater pull be exerted on the said short sides of the coils. Several modifications in which this effect may be obtained are illustrated in Figures 4 to 6. Figure 4b shows the turn of a coil having an internal width $l$. On stretching the turns to obtain the profile of the slot in which it is to be disposed, it must be stretched as disclosed in Figure 4c, and accordingly the internal section of the conductor in Figure 4b, may according to the pull exerted on the narrow arcs of the turns, be reduced to the width $m$ of Figure 4a. If it be further desired to secure the like internal width $m$ of the finished bar for coils having turns of larger pitch (Figure 5b), then, in stretching the turns in order to obtain the cross-section required for the bar, a more powerful pull must be exerted on the small arcs of sides of the individual coils, so that the turns assume a pitch such as is shown in the plan view of the bar in Figure 5a. It will therefore be necessary to initially allow for the narrow side of the coil an arc of such a radius, respectively, such a length, as will allow the securing of the desired pitch for the narrow sides of the finished bar. If, however, a slighter pull be exerted on the turns of a coil, of similar initial shape, then from such a coil having the section shown in Figure 6b, when stretched to conform with the desired profile formation of the composite bar (Figure 6c), there will result an internal width $n$ for the finished bar as shown in Figure 6a which is considerably greater than the internal section $m$ as disclosed by Figure 5a. A considerable amount of cooling air may pass through a hollow conductor of this description. The cross-section of the channel formed in the hollow conductor may consequently likewise be shaped as required by suitably dimensioning the narrow side of the initial coil.

This method of manufacture in accordance with my invention affords a number of important advantages. For instance, by first of all making a flat cylindrical coil there is secured the advantage of all individual wire elements of which the finished conductor bar is composed being alike, so that after having been stretched to a like degree and having been subsequently nested into each other, there will result a conductor bar of uniform structure throughout, possessing no inclination to bending or warping in any direction whatsoever. Owing to the uniformity in form of the individual elements, the latter may be joined closely to each other even where the cross-sectional dimensions are but slight. The bar thus completed may then be compressed in any manner to attain the desired shape. By making the conductor bar out of a plurality of individual elements, there is the additional possibility afforded of insulating its constituent conductor elements relatively to each other to a satisfactory degree, since there now no longer exists the necessity of introducing the insulating material by more or less complicated devices and methods into a conductor composed of a plurality of individual conductors. It will also be found, that our improved method of manufacture is applicable to conductor elements of any desired cross-section.

Whenever our improved method is employed for producing flat conductors of the type described, for example, in Pichelmayer's "Handbuch der Elektrotechnik", Ed. 1908, P. 420, for use in large alternating current machines, a bar is obtained by our method which is exceedingly suitable, in particular for machines having a heavy current output, a considerable length of rotor and altogether large dimensions.

In Figure 7 is illustrated an original or initial coil element constituting a flat wire wound into a flat cylindrical coil. Now if this coil, after having been further flattened by compression (should this be required) to the shape disclosed by Figure 8, be stretched by seizing it by its ends without, however, taking any other precautionary measures, such as grip rings, or the like, there will be produced a stretched conductor of the shape shown by the three conductors in Figure 12. Here three conductors produced from three original coils of the type illustrated in Figure 7 are assembled as a portion of the bar to be produced, of a cross-section shown in Figure 11, to fit a given slot.

It will be noted that in this arrangement, the imaginary planes in which the short arcs $u$ and $v$ are located, are at an angle to the imaginary planes, in which the straight portions $s$ and $t$ are located. This form of individual conductor element when assembled into a bar as shown in Figure 12, will produce small interstitial spaces between the arc portions $u$ and $v$ of adjoining elements, as shown in Figure 12, owing to the raising and crowding of material at the inside of the arc. These spaces represent in the completed conductor bar portions, not filled with useful conductor material.

These spaces may likewise be utilized in accordance with our invention, permitting the use of practically the entire available cross-sectional area of the slot, if the coil be stretched in such a manner that the short side $u$ or $v$, respectively of the coils (Figure 7) are located within the plane in which one or the other adjoining long side $s$ or $t$, respectively, is located. This object may be accomplished by securing the short sides of the coil, during the stretching operation, for instance by means of a pair of flat-nosed pliers, so that the arc portion is held in the plane of one of the adjoining long sides of the coil. This will result in a shape of stretched coil shown in Figure 9, a number of such coil elements being shown assembled in Figure 10, by nesting the individual coil elements into each other to form a finished conductor of the height shown by the dot and dash lines in Figure 10 and of a cross-sectional contour shown in Figure 11.

It will be noted that in the arrangement according to Figure 10, the short arcs of the turns are far more closely disposed to each other than in the arrangement according to Figure 12. The strength of the conductor and the utilization of the available space are thus increased in a simple manner.

A special advantage of the improved arrangement resides in the feature that the short arcs $u$ of the coils, (which for instance in Figs. 8 to 13 constitute the small sides of the coils) extend within the assembled conducting bar in a direction transversely to the axis of the bar and thus to the axis of the slot, so that the slot field is able only to a small degree to create eddy currents.

Arrangements with round conductors shown in Figures 4$^c$, 5$^c$, 6$^c$ may also be made with flat conductors such as illustrated in Figures 7 to 13. It is possible in stretching the individual coils, to also stretch the short arcs $u$, $v$ of Figure 12, so that they assume a similarly oblique position relatively to the conductor bar axis as is shown in Figures 4$^a$, 5$^a$, 6$^a$ in case of round conductors. In this case it is assumed that these arcs do not have too small a radius (for instance Figures 8 and 11 would be unsuited for this purpose) but one of substantial size, for instance as shown in Figure 7, or else they may be given the form shown in Figure 13.

This arrangement, however, shifts the arc portions into a position substantially longitudinally of the slot, such as in case of round conductors arranged according to Figures 4$^c$, 5$^c$, 6$^c$, and therefore the slot field is more likely to generate eddy currents than in case of the modifications according to Figures 10 and 12.

Also in this case like in those of the coils described with reference to Figures 1 to 6, the manner of proceeding may consist in winding a coil in this case however of flat stock, shown in Figure 7, and compressing it if necessary, to such an extent that an internal space remains of a size required for each particular case, suitable, for instance, for the insertion of a longitudinal insulation $i$, such as shown in Figure 11, or for the formation of a channel $k$, such as illustrated by Figure 13 and adapted to be traversed by cooling air. In this latter case the compressing of the initial coil may even be omitted if, as was already mentioned hereinbefore, the coil is wound from the outset over a mandril or given by any other suitable means the internal width required for the cooling channel.

We claim:—

1. The method of producing multiple conductor bars, consisting in winding the constituent conductor elements separately as flat coils, stretching the windings of said coils apart until the desired pitch has been obtained and in nesting said stretched coil elements into each other to form the bar.

2. The method of producing multiple conductor bars, consisting in winding the constituent conductor elements separately as flat coils compressing said coils to the desired thickness of the finished bar, stretching the windings of said compressed coils apart until the desired pitch has been obtained and in nesting said stretched coil elements into each other to form the bar.

3. The method of producing multiple conductor bars, consisting in winding the constituent conductor elements separately as flat coils, stretching the windings of said coils apart until the desired pitch has been obtained and in nesting said stretched coil elements into each other to form the bar, the length of the short sides of said flat coils being suitably chosen to obtain the desired pitch of said sides relatively to the axis of the finished bar.

4. The method of producing multiple conductor bars, consisting in winding the constituent conductor elements separately as flat coils, stretching the windings of said coils apart until the desired pitch has been obtained and in nesting said stretched coil elements into each other to form the bar, the length of the short sides of said flat coils being suitably chosen to obtain the desired pitch of said sides relatively to the axis of the finished bar, and to cause the formation of a longitudinal channel inside of the finished bar.

5. The method of producig multiple conductor bars, consisting in winding the constituent conductor elements separately as flat coils, stretching the windings of said coils apart until the desired pitch has been obtained and in nesting said stretched coil elements into each other to form the bar, the short sides of said coils being held in the plane of one of the adjacent long coil sides during the stretching operation.

In testimony whereof we affix our signatures.

REINHOLD RÜDENBERG.
ADOLF FINCKBEIN.